US007398166B2

(12) United States Patent
Stirnemann

(10) Patent No.: US 7,398,166 B2
(45) Date of Patent: Jul. 8, 2008

(54) METHOD AND APPARATUS FOR THE MEASUREMENT OF THE ACOUSTIC IMPEDANCE

(75) Inventor: Alfred Stirnemann, Zollikon (CH)

(73) Assignee: Phonak AG, Stafa (CH)

( * ) Notice: Subject to any disclaimer, the term of this patent is extended or adjusted under 35 U.S.C. 154(b) by 0 days.

(21) Appl. No.: 10/621,476

(22) Filed: Jul. 17, 2003

(65) Prior Publication Data

US 2004/0176702 A1 Sep. 9, 2004

(30) Foreign Application Priority Data

Mar. 6, 2003 (EP) ................................. 03005040

(51) Int. Cl.
*G01F 17/00* (2006.01)
(52) U.S. Cl. ........................................................ 702/54
(58) Field of Classification Search ................. 600/559; 73/585, 589; 702/57, 66, 189, 81, 54
See application file for complete search history.

(56) References Cited

U.S. PATENT DOCUMENTS

| 4,079,198 | A | * | 3/1978 | Bennett ....................... 600/559 |
| 4,289,143 | A | | 9/1981 | Canavesio et al. |
| 5,119,427 | A | * | 6/1992 | Hersh et al. ............... 381/71.14 |
| 5,699,809 | A | * | 12/1997 | Combs et al. ............... 600/558 |
| 5,792,072 | A | | 8/1998 | Keefe ......................... 600/559 |
| 5,919,143 | A | * | 7/1999 | Jenkins et al. .............. 600/549 |
| 6,126,614 | A | * | 10/2000 | Jenkins et al. .............. 600/549 |
| 6,139,507 | A | * | 10/2000 | Jeng .......................... 600/559 |
| 6,358,216 | B1 | * | 3/2002 | Kraus et al. ................. 600/549 |

OTHER PUBLICATIONS

Okabe et al, "Headphone Responses on real ears and a head and Torso simulator", ICASSP 1986, Tokyo, IEEE.*

* cited by examiner

*Primary Examiner*—John Barlow
*Assistant Examiner*—Aditya Bhat
(74) *Attorney, Agent, or Firm*—Pearne & Gordon LLP

(57) ABSTRACT

A probe located in an area to be measured has an acoustic stimulator, (e.g., a loudspeaker and a microphone). The stimulator sends acoustic signals to the microphone where the signals are transformed into electrical signals and transferred to an analysis unit. Using a defined stimulation followed by a two-port chain transfer matrix connected to an impedance as a model, the voltage ratio between the stimulation and the impedance is described as a dimensionless transfer function of a complex function of the stimulation frequency. A series of acoustic calibration signals are generated by known acoustic impedances covering different calibration scopes using the stimulation. The calibration signals are recorded and the electric values are merged with the respective voltage values of the stimulation for evaluation of the respective transfer functions which are merged together into an over-determined linear system of equations. The impedance is determined by evaluating the transfer functions.

20 Claims, 2 Drawing Sheets

Fig. 1
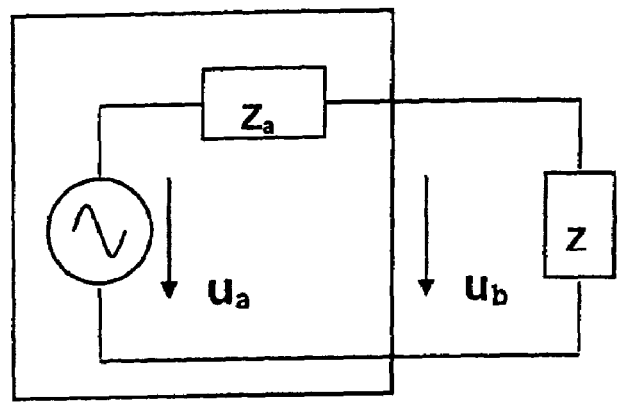
Fig. 2
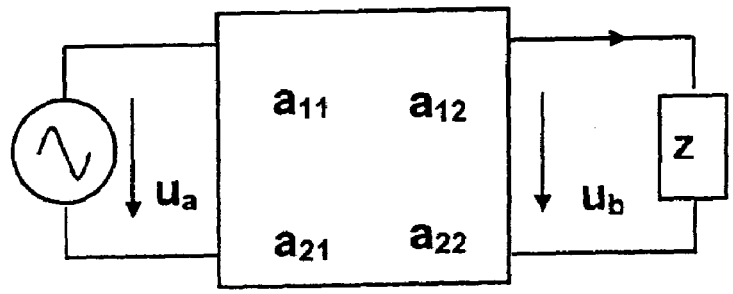
Fig. 3
$$\begin{bmatrix} U_{ab1} \\ U_{ab2} \\ . \\ . \\ . \\ U_{abn} \end{bmatrix} = \begin{bmatrix} 1 & 1/Z_1 \\ 1 & 1/Z_2 \\ . & . \\ . & . \\ . & . \\ 1 & 1/Z_n \end{bmatrix} \begin{bmatrix} a_{11} \\ a_{12} \end{bmatrix}$$

METHOD AND APPARATUS FOR THE MEASUREMENT OF THE ACOUSTIC IMPEDANCE

FIELD OF THE INVENTION

The present invention relates to a method and an apparatus for the determination of the acoustic impedance, and more particularly to the determination of the acoustic impedance of cavities such as the human ear.

BACKGROUND OF THE INVENTION

A measurement system consisting of two components will conventionally be used for the determination of the acoustic impedance of a closed room. The two components are a microphone and a loudspeaker which are connected to an analysis unit. This arrangement is frequently supplemented by a third connector to apply static pressure.

A probe with three connectors is especially used for the measurement of the acoustic impedance of the ear in functional relationship to the static pressure for diagnostic purposes. The connectors thereby couple the probe, which is inserted into the ear channel, with a static pressure generator, a microphone and a loudspeaker.

The evaluation of the measurement will thereby be performed by electronic or computerized analysis units. The calibration of the measurement equipment takes place typically by use of a set of tubes with defined geometrical dimensions and acoustic behavior. The principle of Thévenin for the measurement of unknown impedances is used for the characterization of the measurement system. The measurement system then may be represented by a voltage source and a first impedance.

The voltage will then be measured over a second series connected unknown impedance. This measured voltage stands in a direct coherence with the unknown impedance, whereby all magnitudes or parameters are complex functions of the frequency. The system now has first to be calibrated, e.g. the parameters of the system have first to be calculated by the use of calibrated impedances, i.e. with at least two calibrating impedances. If the parameters of the voltage source and the first impedance are known, the second unknown impedance may be determined by measuring the voltage over this second impedance. This method is described in detail in U.S. Pat. No. 5,792,072.

Such a method and apparatus are described as well in U.S. Pat. No. 4,289,143. A probe will thereby be entered closely into the entrance of the ear channel, thereby emitting short acoustic pulses of a broad wave band penetrating into the ear channel, and the respective response signals will be detected by a loudspeaker integrated as well in the probe and converted into electrical signals. Those signals will subsequently be digitalized and transformed into a Fourier series which then will be analyzed by a processor. The analysis will be made vis-à-vis stored values, which values have been determined by the antecedent application of the method with two calibrated measuring impedances, such as two cylindrically measuring tubes with different dimensions. The processor or the analysis electronic respectively will be used at the same time for the controlling of the pulse generator and eventually for the controlling of a static pressure generator as well, which may be connected to the probe as well.

But both of the described methods suffer of some disadvantages. A phase relation between the voltage of the voltage source (or the system respectively) and the measured voltage over the second impedance is necessary to determine the second impedance (complex impedance). As this voltage cannot directly be observed by the principle of Thévenin, the phase has to be determined by way of a detour.

Furthermore, those methods are no longer usable if the stimulation changes between calibration and measurement, i.e. if the voltage of the generator is not constant. After all, noise effects occurring during the active measurement of the voltage over the second impedance will falsify the result.

The universal application of the measurement method according to U.S. Pat. No. 4,289,143 for the measuring of general acoustic impedances will as well lead to geometrical problems. As all three connectors for loudspeaker, microphone and static pressure generator are arranged in the same plane at the exit of the probe, in which plane the impedance to be measured is defined, the coupling of individual acoustic elements will lead to geometrical problems, especially if the opening cross section is smaller than the diameter of the probe.

This is for example the case by coupling small tubes, be it as reference impedances for the calibration of the measurement equipment or as objects to be measured. It is essentially in such cases to use additional coupling volumes. The use of complex modules such as wind shields or membranes is as well problematic. Furthermore in the field of ear measurement, the risk of choking the probe occurs, which rules out the measurement or destroys the calibration and therefore falsifies the result.

OBJECT OF THE INVENTION

An object of the present invention is to provide a measuring method for an easy and simple measurement of impedances by overruling the known disadvantages. A further object is to provide an apparatus for performing such measurements.

SUMMARY OF THE INVENTION

In accordance with the present invention, the method for the determination of the acoustic impedance comprises the steps of sending out acoustic signals with a probe arranged at the area to be measured comprising a mean for the acoustic stimulation and a microphone and transforming the received signals into electrical signals. The electrical signals will then be transferred to an analysis unit in which the magnitude or value of the impedance will be determined. As a calculation base, the defined stimulation will be followed by a chain transfer matrix in form of a twoport until the impedance to be measured, whereby the voltage ration between stimulation and impedance is described as a dimensionless transfer function in form of a complex function of the stimulation frequency. As series of acoustic calibration signals will be generated by a number of known acoustic impedances covering different calibration scopes by means of the defined stimulation. The calibration signals received by the microphone are recorded in the probe and the electric values are merged together with the respective voltage values of the stimulation for evaluating the results of the respective transfer functions. The transfer functions of the calibration signals will then be merged together into an over determined linear system of equations and by solving this system of equations the two coefficients will be calculated. Finally the impedance to be measured will be determined by evaluating the transfer function under defined stimulation by use of the coefficients determined by the foregoing calibration.

The stimulation may be observed or measured due to the description of the relation between stimulation and voltage over the impedance to be measured with a chain matrix model in contrary to the model of Thévenin. Thus the determination of the phase relation between those values will be much easier. Furthermore, the proposed use of a dimensionless transfer function leads to a calculation of the impedance independently especially from the stimulation voltage.

Therefore, the mathematical model of the transfer between stimulation and microphone in relation to the voltage transfer will be described completely by the two coefficients a11 and a12 of the chain matrix, according the equation:

$$Uab = \frac{ua}{ub} = a11 + a12/Z$$

Those coefficients will now be determined on the basis of known calibration impedances by solving the respective over determined linear system of equation. Thus a simpler execution and calculation of the calibration may be performed with respect to the known method by Thévenin.

The individual transfer functions by the execution of the calibration will be calculated from the quotient between the auto power spectrum UaUa* and the average of the cross power spectrum UbUa*. Thus any interferences of the measuring magnitude ub will favorably be suspended, i.e. the voltage of the impedance measured by use of the microphone. At least two calibration impedances will be used for this purpose.

In a preferred embodiment, the system of equation will be solved in terms of minimum squares.

In a further embodiment, the stimulation will be made by use of a controlled frequency generator over a loud speaker. A broadband signal will thereby be produced, e.g. a white noise. The spectrum of frequency may be reduced to a determined bandwidth according the employment.

In a further embodiment, the use of two serial connected twoports, i.e. two successively arranged chain matrices, is proposed as computation model, to cover the universal measurement of geometrically different measuring objects, which may be coupled over an additional adaptor. The microphone will then be positioned between the output of the first twoport and the input of the second twoport, i.e. the respective measurement will be performed between the two matrices, whereas the impedance is arranged at the outlet of the second matrix. The first matrix thus represents the model of the base element of the measuring probe and the second matrix the model of the adapter arranged after the microphone. The base element of the probe may be composed identically for any applications and thereby builds up constant circumstances. The adaptor is arranged detachable with the base element and implemented in a great number of different embodiments, especially with different geometrical dimension, according the field of application. The individual adapters are therefore having different system behaviors and a separate calibration has to be performed for each adapter.

The model consisting of 8 matrix elements is preferably reduced to three base parameters in form of complex functions of the frequency, describing the model sufficiently precise.

The three parameters may be determined by solving the linear system of equation resulting by the measurement of three different calibration impedances and may subsequently be used for the calculation of the unknown impedance. Again only the transfer functions between stimulation and voltage of the microphone will have to be measured.

In a further embodiment, an acoustic resistor will be arranged between the stimulation and the microphone. It has been shown that the accuracy of the measurement will thus be further enhanced. The resistor may be optimized in view of-the sensitivity due to microphone errors.

In a further embodiment, the method will be used to determine the acoustic ear impedance.

The use of two serial connected twoports considers the use of different coupling means, such as foam plugs, ear moulds, hearing device shells etc.

The need of flexibility with respect to the coupling in the field of ear impedance measurement will be advantageously accomplished by the present invention, which allows the measurement with individual adaptors which are quickly built and calibrated.

In a further embodiment, an apparatus for the determination of the acoustic impedance comprising a probe, a microphone and a speaker is proposed, whereby the microphone is arranged between both twoports.

BRIEF DESCRIPTION OF THE DRAWINGS

Examples of the present invention will now be described in detail with reference to the accompanying drawing in which:

FIG. 1 is a schema of the determination of a impedance according the Thévenin principle;

FIG. 2 is a schema of an embodiment of the inventive method of measuring impedances using a chain matrix;

FIG. 3 is an embodiment of the linear system of equations underlying the inventive method;

DETAILED DESCRIPTION OF THE INVENTION

Figure 4:
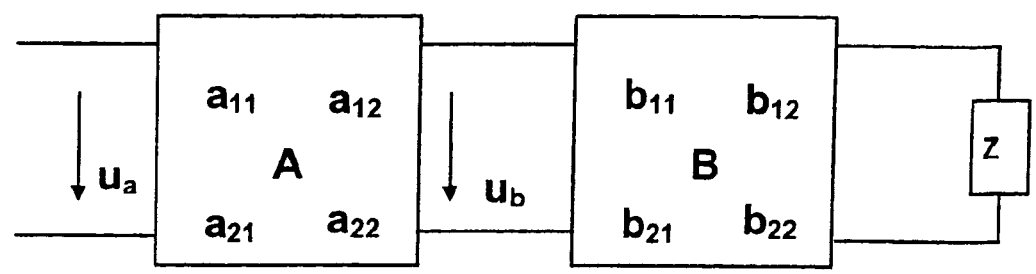
FIG. 4 is a further schema of a further preferred embodiment of the inventive method with two matrices.

FIG. 1 shows schematically the principle of a measurement of an unknown impedance according Thévenin. This principle is based on a base system, which is theoretically described as a voltage source with the complex voltage ua and a total serial impedance Za. This base system serves for the stimulation and transforming of the voltage to the impedance Z to be measured. A voltage ub may be measured over this load impedance Z. The values stand thereby in the following relation:

$$Z = \frac{ubZa}{ua - ub}$$

The parameters ua und Za may be calculated by performing measurements with at least two known calibration impedances Z(1) and Z(2). The load impedance Z can thus be determined by the measuring of the voltage ub according the above equation. It has to be considered that all magnitudes or values respectively are complex functions in relation to the frequency of the stimulation voltage ua. That is the reason why the phase relation between ua und ub has to be known, which phase relation has to be observed separately as ua cannot directly be observed or measured with such a system.

Another model is now proposed by the present invention to overcome this disadvantage, which model is as an example shown by the schema according FIG. 2. The stimulation by use of a generator with the voltage ua is considered as to be observed or measured and the borders of the base system will be drawn only after the generation of this stimulation voltage. A twoport with assigned chain transfer matrix A, which is described by the parameters a11 to a22, will be used as a model for the transfer system. Thus a dimensionless transfer function Uab may be defined as a voltage relation between the input generator voltage ua and the output or measuring voltage ub over the impedance Z.

$$Uab = \frac{ua}{ub} = a11 + a12/Z$$

Therefore, the base system is fully described with respect to the transfer of the voltage by the two parameters a11 and a12, whereas all values are complex functions in relation to the stimulating frequency.

The parameters a11 and a12 have now to be determined analog to the principle of Thévenin by measuring calibration impedances Z1, Z2, ..., Zn, which will be applied into an over determined linear system of equation according FIG. 3.

To suppress interferences of the measuring value ub, the respective transfer functions of the linear system of equation will preferably be calculated by use of averaging techniques. Each transfer function Ua will thereby be calculated by the division of the measured auto power spectrum UaUa* through the average cross power spectrum UbUa* according the formula:

$$Uab = \frac{UaUa^*}{UbUa^*}$$

The solution of the linear system of equation according FIG. 3 in terms of minimum squares provides the two parameters a11 and a12. The transfer function Uab may be measured from the measuring of the voltage relation ua/ub for a unknown impedance Z and thereafter the impedance Z may be evaluated by the following formula:

$$Z = \frac{a12}{Uab - a11}$$

As a great advantage, no effort has to be taken to determine the phase between ua and ub, and the measuring method is independent from the stimulation voltage due to the use of a dimensionless transfer function Uab. A reduced sensitivity of the measuring system compared to measuring noise will be achieved by using averaging techniques, e.g. the sensitivity compared to microphone noise and interference noise are strongly reduced.

A measuring device for the precise determination of impedances of cavities may now be simply built by using the present principle, and may be operated with common measuring and computing means. The calibration of such measuring devices may be simply performed by using the linear system of equation, which will make its use economic even outside of laboratory conditions.

The inventive method is suitable for use of measuring the acoustic impedance of the human ear, whereby the measuring can take place under different static pressure situations analog to the known methods.

The principle has been further developed for the universal practical use, especially to use the base apparatus for different measurement kinds with different geometries.

The use of different adapters to be connected with the base apparatus is proposed to cover the different measuring environments. Those adaptors naturally modify the base system and disallow the use of the principles of Thévenin, as the voltage over the microphone does no longer represents the actual sound pressure over the impedance to be measured.

Figure 5:
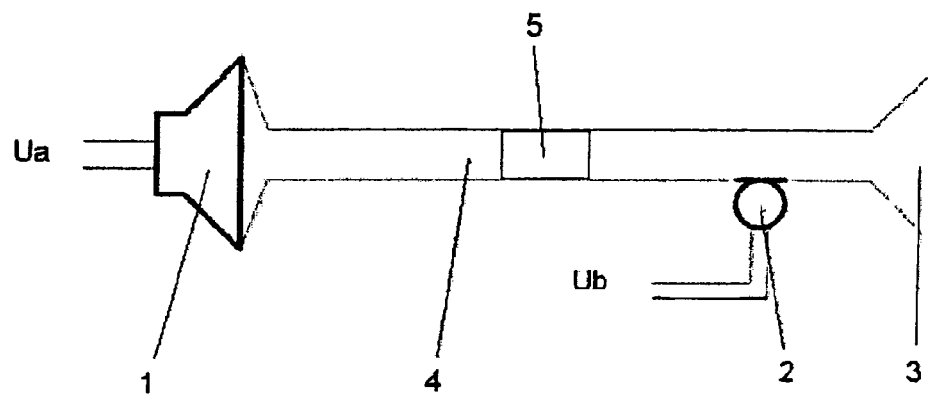
FIG. 5 is the schematic arrangement of a measuring apparatus for performing the method according FIG. 4.

The inventive principle will be extended with an adaptor matrix B, as shown schematically in FIG. 4. The voltage ub will not be gripped at the end over the impedance to be measured but between the two matrices A and B. The advantage is that in the practical realization of such a measuring apparatus the microphone has not to be arranged headmost at the location of the impedance to be measured but some way backwards, thus on the one hand protecting the microphone and on the other hand leaves open the freedom of design of any adaptor, as shown schematically in FIG. 5. FIG. 5 shows schematically a probe for the execution of the method described above comprising a loudspeaker 1 and a microphone 2 arranged within a connecting channel 4. An acoustic resistor 5 is arranged in the connecting channel 4 between the loudspeaker 1 and the microphone 2. The connecting channel 4 leads into an adapter 3, which may be arranged unlockable or detachable respectively with the housing of the probe. Alternatively the resistor 5 may be arranged after the microphone 2 at the end of the connecting channel 4 or the adapter 3.

The 8 parameters a11, ..., a22 and b11, ..., b22 of both matrices A and B may be reduced for such an application to three parameters d1, d2 and d3 to describe the impedance Z, according the following equation:

$$Z = \frac{d2}{Uab - d1} - d3$$

Those three parameters d1, d2 and d3 are analog to the antecedent specified parameters a11 and a12 as well complex functions with respect to the stimulation frequency. According to the antecedent specified approach for the calculation of the parameters a11 and a12, an over determined linear system of equation can be formulated, which may provide three parameters d1, d2 and d3 by use of at least three known calibrating impedances and solving the system of equation in terms of minimum squares.

An optimal accuracy of the measurement will be achieved by specifically frequency or impedance weighing of the equation. Optimal measuring accuracy can thus be achieved for a defined application area.

The arranging of an acoustic resistor between the stimulation and the microphone has been shown as an advantage. The accuracy of the measuring device may further be increased by use of such an acoustic resistor. The resistor may be optimized in view of its sensitivity concerning faults of the microphone for a determined range of impedance.

Besides the application in the field of hearing devices, the present method may be used universally for general purposes of the measuring of impedances, especially in the field of quality control of porous bodies, membranes or textiles.

Especially the possibility of the use of individual adaptors with different geometrical dimensions allows the universal use of such a measuring apparatus according the present claimed method.

What is claimed is:

1. A method for the determination of an acoustic impedance Z, comprising the steps of:
    arranging a probe with a means for acoustic stimulation and a microphone at the area to be measured;
    sending out acoustic signals over said means and receiving again over the microphone;
    transforming the received signals by the microphone into electrical signals for input to an analysis unit, in which the amount of the impedance Z will be determined;
    inputting a previously defined stimulation into a twoport chain transfer matrix as a calculation base for the impedance Z,
    wherein the voltage ratio between the stimulation and the impedance is described as a dimensionless transfer function in a form of a complex function of the stimulation frequency;
    generating a series of acoustic calibration signals by a number of known acoustic impedances covering different calibration scopes by means of the defined stimulation;
    recording the calibration signals received by the microphone and merging the electric values together with the respective voltage values of the stimulation for the evaluation of the results of the respective transfer functions;
    merging together the transfer functions of the calibration signals into a an over-determined linear system of equations and solving the system of equations for calculating two coefficients; determining the impedance Z, calculated by evaluating the transfer function under the defined stimulation by use of the two coefficients; and
    the analysis unit outputting the determined impedance Z to an external entity.

2. Method of claim 1 wherein a loudspeaker is used as a mean for the acoustic stimulation.

3. Method of claim 1 wherein the over determined linear system will be solved in terms of minimum squares.

4. Method of claim 1 wherein at least two different impedances are used.

5. Method of claim 1 wherein a combination of hollow bodies and small tubes with defined dimensions and known impedances are used as calibrating impedances.

6. Method of claim 1 wherein a frequency generator is used for the stimulation by generating a broad band signal of white noise.

7. Method of claim 1 wherein the transfer functions will be calculated by the division of the measured auto power spectrum of the stimulation through the average cross power spectrum between stimulation and impedance to be measured.

8. Method of claim 1 wherein two series connected twoport chain matrices are used, wherein the microphone is arranged between the output of the first twoport and the input of the second twoport.

9. Method of claim 8 wherein the elements of the two chain matrices are reduced to three base parameters, which are evaluated by measurements of at least three calibration impedances with known impedances and the respective solution of the over determined linear system of equations to further determine the impedance to be measured by measuring of the transfer function as a division between the stimulation and the microphone signal by use of the base parameters.

10. Method of claim 9 wherein the linear system of equations will be solved in terms of minimum squares.

11. Method of claim 1 wherein an acoustic resistor is arranged between the stimulation and the microphone.

12. Method of claim 11 wherein the sensitivity of acoustic resistor is optimized with respect to microphone errors.

13. Method of claim 1 wherein a frequency and/or impedance specific weighting of the linear systems of equation is performed.

14. Method of claim 1 for measuring the impedances of hearing devices, part systems of hearing devices, shells of hearing devices, and vents of hearing devices.

15. Method of claim 1 for measuring the impedances in the field of quality control, preferably the quality control of hearing device transducers, porous bodies, membranes and textiles.

16. A method for the determination of the acoustic impedance of cavities, such as an ear in connection with a hearing aid, comprising the steps of:
    arranging a probe with a microphone and a speaker at the area to be measured;
    sending out acoustic signals over the speaker into the cavity and receiving again over the microphone;
    transforming the received signals by the microphone into electrical signals and transferring them to an analysis unit;
    using a previously defined stimulation input to a twoport chain transfer matrix as a calculation base for the impedance Z,
    wherein the voltage ratio between the stimulation and the impedance is described as a dimensionless transfer function in a form of a complex function of the stimulation frequency;
    generating a series of acoustic calibration signals by a number of known acoustic impedances covering different calibration scopes by means of the defined stimulation;
    recording the calibration signals received by the microphone and merging the electric values together with the respective voltage values of the stimulation for the an evaluation of the results of the respective transfer functions;
    merging together the transfer functions of the calibration signals into an over-determined linear system of equations and solving the system of equations for calculating and storing two coefficients; determining the impedance Z to be calculated by evaluating the transfer function by use of the two coefficients; and
    outputting the determined impedance Z for use by an external entity.

17. Method of claim 16 wherein two series connected twoport chain matrices are used, and wherein the microphone is arranged between the output of the first twoport and the input of the second twoport.

18. Method of claim 16 for measuring the impedances of hearing devices, part systems of hearing devices, shells of hearing devices, and vents of hearing devices.

19. Method of claim 16 for measuring the impedances in the fields of quality control of hearing device transducers, porous bodies, membranes, and textiles.

20. An apparatus for the determination of an acoustic impedance Z comprising:
    a probe;
    a microphone;
    a speaker;

an acoustic resistor arranged between the speaker and an exit opening within a connecting channel connecting to one of the microphone and an exit of the probe; and an analysis unit for receiving electrical signals from the microphone, and for determining an impedance Z, wherein a series of acoustic calibration signals of a number of known acoustic impedances covering different calibration scopes are generated by means of a predefined stimulation for output by the probe for reception by the microphone, and wherein the analysis unit comprises a function for solving an over-determined linear system of equations in terms of minimum squares by use of at least three of said acoustic calibration signals.

* * * * *